Aug. 1, 1950      A. H. LAMB      2,517,325
MAGNETIC PROBE
Filed April 7, 1947
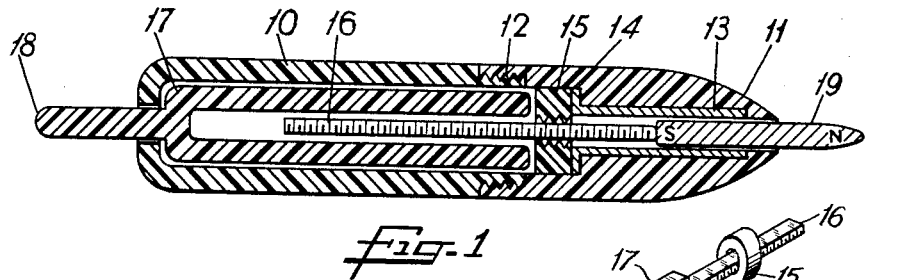
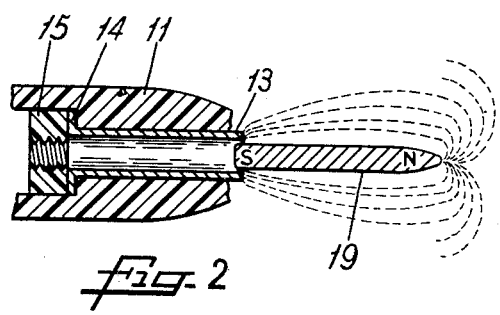
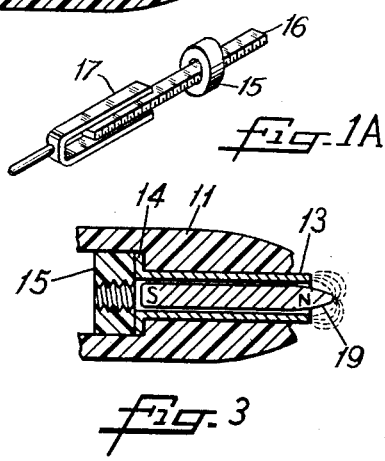
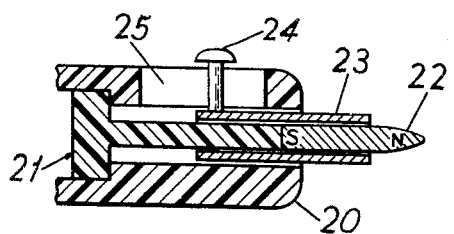
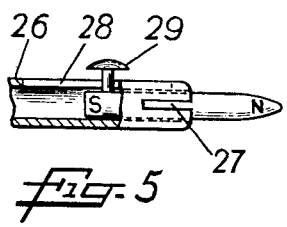
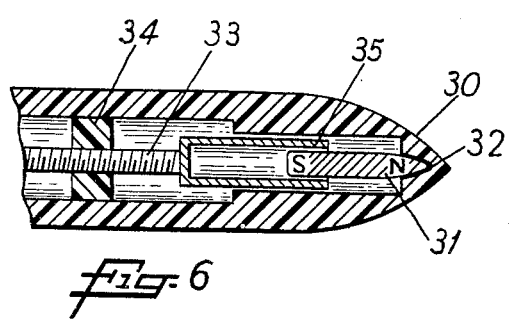
Inventor
Anthony H. Lamb
by Rudolph J. Jurick
Attorney Patented Aug. 1, 1950

2,517,325

UNITED STATES PATENT OFFICE 2,517,325

MAGNETIC PROBE

Anthony H. Lamb, Hillside, N. J.

Application April 7, 1947, Serial No. 739,963

3 Claims. (Cl. 128—1.4)

This invention relates to a magnetic probe and more particularly to a novel probe comprising a permanent magnet carried by a housing and including means for altering the magnetic strength of the field of the magnet and the shape of the flux pattern.

A magnetic probe made in accordance with this invention is a novel instrument adapted to a great variety of useful purposes. It provides a convenient and necessary instrument for physicians, surgeons, hospital staffs and first aid workers as it can be employed for the extraction of iron, steel, and other magnetic splinters from the eye or skin without pain or danger of cutting or otherwise injuring the tissue. It is sanitary, and it can also be used by housewives to remove metal chips from food, it being a known fact that such chips are generated by even the best type of can openers. Such chips may be harmful to the delicate stomach and intestinal tissues. The probe is useful in industry to remove magnetic particles from the air-gap of electrical instruments and other delicate mechanisms the operation of which would be impaired by such particles. Other useful purposes to which the device is adapted will become apparent from the following description.

An object of this invention is the provision of a magnetic probe in which a permanent magnet is adapted to be expelled from or retracted into the housing.

An object of this invention is the provision of a magnetic probe comprising a housing carrying a permanent magnet and including means for adjusting the effective strength of the magnet.

An object of this invention is the provision of a magnetic probe comprising a housing, a permanent magnet, and adjusting means associated with the magnet whereby the effective strength of the magnet is a function of the extent to which the magnet is expelled from the housing.

More specifically it is an object of this invention to provide a magnetic probe comprising a housing in the general form of a pencil body, a permanent magnet carried by the housing, a magnetic material associated with the magnet and means effective to alter the relative position of the magnet and the magnetic material whereby the effective strength of the magnet is altered in accordance with the relative position of the magnet and the magnetic material.

These and other objects and advantages will be apparent from the following description when taken with the accompanying drawings which illustrate several embodiments of the invention. The drawings are for purposes of illustration and are not to be construed as defining the scope or limits of the invention, reference being had for this purpose to the appended claims.

In the drawings wherein like reference characters refer to like parts in the several views:

Figure 1 is a longitudinal, cross-sectional view illustrating a complete device made in accordance with this invention;

Figure 1A is an isometric view of the internal, operative parts;

Figure 2 is a fragmentary, cross-sectional view of the device illustrated in Figure 1 and showing the magnet substantially fully extended from the housing;

Figure 3 is similar to Figure 2 but with the tip of the housing broken away to show the reduced character of the magnetic field when the magnet is substantially fully retracted within the housing;

Figure 4 is a fragmentary, cross-sectional view illustrating another embodiment of the invention;

Figure 5 is a fragmentary view, partially in cross-section, and illustrating a simplified embodiment of the invention; and Figure 6 is also a fragmentary, cross-sectional view of still another embodiment.

Referring now to Figure 1, a magnetic probe made in accordance with this invention comprises a tubular housing having a rear section 10 and a tapered front section 11. The two sections of the housing may be detachably united as by the coacting threads 12 to form a unitary body having a smooth exterior surface and the housing sections may be made of any suitable material such as, for example, a plastic, as shown. Disposed within the tapered front section 11 is a tube 13 made of a magnetic material such as soft-iron and having a flared inner end 14 that abuts against the wall of the plastic section 11 substantially as shown. A bushing 15, having a threaded hole in the center is either force fitted within the section 11 or fixed in position by cement. An assembly of this type prevents axial motion of the tube 13.

Operating through the bushing 15 is a threaded rod 16, said rod having a substantially rectangular cross-section wherein two opposed surfaces are threaded and the other two opposed surfaces are plain. Surrounding one end of the rod 16 is a fork shaped member 17 that protrudes from the housing 10 in the form of a knob 18, as shown. The spacing between the forked ends of the member 17 is such that rotation of the knob 18 causes rotation of the rod 16 causing the latter to thread through the bushing 15, as shown in Figure 1A. As the maximum diameter of the rod 16 is somewhat less than the internal diameter of the soft-iron tube 13, the rod 16 moves into or out of the tube 13 in response to rotation of the knob 18.

Disposed within the soft-iron tube 13 is a permanent magnet 19 of bar form and having a somewhat tapered outer end. Although the magnet may be retained within the tube 13 by friction, the magnetic attraction between the magnet and the tube will also prevent the magnet from falling out of the housing. It will now be apparent that rotation of the knob 18 in one direction will cause the rod 16 to expel the magnet 19 from the tube 13 and the housing. Rotation of the knob in the reverse direction will cause the rod 16 to move away from the magnet in which case the magnet can be pushed back into the tube 13 by finger pressure. Alternatively, the rod 16 can be cemented or otherwise affixed to the end of the magnet to automatically retract the magnet into the tube 13.

The magnetic lines of flux emanating from a bar magnet in free air, flow in a smooth wide path from the North to the South pole. However, the normal direction of the flux can be altered by inserting a magnetic material into the flux path, as the magnetic material has a lower magnetic reluctance than air. As shown in Figure 2, the magnet 19 is well extended from the soft-iron tube 13 and the relatively large field of magnetic influence is indicated by the dotted lines. Under this condition the effective distance of the magnetic flux from the outer free end of the magnet is a maximum. Figure 3, on the other hand, shows the magnet 19 substantially fully retracted within the soft-iron tube 13. In this case the lines of magnetic flux pass directly to the soft-iron tube and the effective field of the magnetism from the free end of the magnet is a minimum.

It is now apparent that the effective strength of the permanent magnet, so far as concerns useful purposes, is a direct function of the extent to which the magnet protrudes from the tube 13. As the magnet can be expelled from the tube any desired amount by rotation of the knob 18, my invention provides a magnetic probe in which the magnetic strength may be adjusted in a convenient manner to meet desired conditions of use. This feature is of particular importance to physicians and first aid workers as, for example, in removing a steel splinter from the eye. Often the steel splinter imbeds itself in the eye in such manner that its position must be changed before it can be extracted safely without painful rupture of the surrounding tissues. Such a maneuver can best be accomplished by employing a relatively weak magnet, that is, one having sufficient strength to impart a motional effect upon the splinter yet not powerful enough to cause the splinter to "jump" to the magnet through the tissues. Once having properly positioned the splinter the magnetic strength of my probe can readily be increased for final extraction of the steel splinter.

Figure 4 illustrates another embodiment of my invention wherein the permanent magnet remains stationary and the soft-iron tube is movable to effect a change in the magnetic strength. Fixed within a plastic housing 20 is a T shaped member 21 that is affixed to the magnet 22 by cement or other suitable means. A soft-iron tube 23 is adapted to slide over the magnet 22 and its position is adjustable by means of the finger operable knob 24 that extends through an opening 25 in the housing 20, substantially as shown. The knob 24 is affixed to the tube 23 by cement, solder or otherwise.

Figure 5 illustrates a simplified embodiment of my invention wherein the housing proper is made of a magnetic material. In this construction the housing comprises a soft-iron tube 26 having a slit 27 in the end and a slot 28 in the side, the latter terminating short of the housing end. Fastened to the magnet is a finger operable knob 29 that extends through the slot 28. By sliding the knob 29 to the right the magnet is extended from the housing and the effective magnetic strength is increased. The soft-iron housing 26 adjusts the effective strength of the magnet as described in detail with reference to Figures 2 and 3.

In certain uses of the magnetic probe it is desirable that the magnet proper be provided with a sanitary covering to prevent direct contact between the magnet and the medium into which it is inserted. The embodiment illustrated in Figure 6 accomplishes this end. The tapered housing 30 may be made of a transparent plastic. A tapered magnet 31 may be either molded directly into the tip of the housing or cemented therein by a plastic cement 32 substantially as shown. A threaded rod 33 is adapted to operate through the fixed bushing 34 in a manner similar to that described with reference to Figure 1. Cemented to the end of the rod 33 is a soft-iron tube 35 slidable over the magnet 31. Rotation of the rod 33 will cause the tube 35 to overlie the magnet to a greater or lesser extent thereby altering the effective field of the magnetic flux emanating from the tapered end of the magnet.

While I have illustrated and described constructions employing a simple permanent magnet and a magnetic flux altering means comprising a soft-iron tube surrounding the magnet, the invention is not to be limited to this particular combination. It will be apparent to those skilled in the art that the flux altering means may take the form of a simple flat bar of magnetic material rather than a tube. In fact the flux altering means may itself be a permanent magnet. Therefore, the term "flux altering means" recited in the claims is intended to cover any combination of a permanent magnet and a cooperating magnetic member arranged to alter the path of the magnetic flux emanating from the end of the magnet for the purposes and in the manner specified.

Having now described my invention, its utility and mode of operation, variations in the size, form, arrangement and relation of the parts will be apparent to those skilled in the art. Such variations may be made without departing from the spirit and scope of the invention as set forth in the following claims.

I claim:

1. A magnetic probe comprising a tubular housing, a permanent magnet of bar form having an inner end disposed within one end of said housing. flux altering means effective to change the path of the magnetic flux emanating from the outer end of the magnet, and means operable externally of the housing to alter the relative position of the magnet and the flux altering means.

2. The invention as recited in claim 1, wherein the flux altering means is fixed with respect to the housing and the position of the magnet is adjustable with respect to the flux altering means.

3. A magnetic probe comprising a tubular housing, a magnetic tube disposed in fixed position at one end of the housing, a permanent magnet slidable within the magnetic tube, a rod movable axially to expel said magnet from said magnetic tube, and means operable externally of the housing to impart axial motion to the said rod.

ANTHONY H. LAMB.

REFERENCES CITED

The following references are of record in the file of this patent:

UNITED STATES PATENTS

| Number | Name | Date |
| --- | --- | --- |
| 1,410,660 | Duclos | Mar. 28, 1922 |
| 1,597,500 | Alexander et al. | Aug. 24, 1926 |
| 2,390,339 | Ullman et al. | Dec. 4, 1945 |

FOREIGN PATENTS

| Number | Country | Date |
| --- | --- | --- |
| 441,632 | Germany | Mar. 8, 1927 |